(12) United States Patent
Yoshida

(10) Patent No.: US 6,476,937 B1
(45) Date of Patent: *Nov. 5, 2002

(54) FACSIMILE APPARATUS HAVING COMMUNICATING FUNCTION OF NONSTANDARD PROCEDURE AND COMMUNICATING FUNCTION OF STANDARD PROCEDURE

(75) Inventor: Takehiro Yoshida, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/959,034

(22) Filed: Oct. 28, 1997

(30) Foreign Application Priority Data

Oct. 28, 1996 (JP) .............................. 8-302486

(51) Int. Cl.⁷ .............................. H04N 1/00; H04N 1/32
(52) U.S. Cl. .................. 358/434; 358/442; 358/468
(58) Field of Search .................. 358/434, 435, 358/436, 438, 439, 440, 442, 405, 400, 468, 1.15, 425; 379/100.01, 100.06, 100.15, 102.07, 117

(56) References Cited

U.S. PATENT DOCUMENTS

| | | | | |
|---|---|---|---|---|
| 5,048,078 A | * | 9/1991 | Satomi et al. | 379/100 |
| 5,125,025 A | * | 6/1992 | Lim | 358/434 |
| 5,448,378 A | * | 9/1995 | Matsumoto | 358/468 |
| 5,585,938 A | * | 12/1996 | Imamura | 358/434 |
| 5,587,810 A | * | 12/1996 | Feldman | 358/442 |
| 5,721,731 A | * | 2/1998 | Yoshida | 370/296 |
| 5,748,334 A | * | 5/1998 | Yoshida | 358/435 |
| 5,751,441 A | * | 5/1998 | Morimoto | 358/435 |
| 5,790,641 A | * | 8/1998 | Chan et al. | 379/100.17 |
| 5,812,281 A | * | 9/1998 | Mukai et al. | 358/435 |
| 5,847,842 A | * | 12/1998 | Maeda | 358/434 |

* cited by examiner

Primary Examiner—Madeleine Nguyen
(74) Attorney, Agent, or Firm—Fitzpatrick, Cella, Harper & Scinto

(57) ABSTRACT

According to the invention, when a communication in a nonstandard signal is not continuously established a predetermined number of times and pre-procedure errors occur at a predetermined ratio or more in the the predetermined number of times of communications, a communication is performed without transmitting the nonstandard signal such as an NSF signal or the like in the subsequent communication.

20 Claims, 14 Drawing Sheets

FIG. 7

| |
|---|
| S22, S58 |
| CHANGE (NONSTANDARD COMMUNICATION INHIBITION FLAG = 0) TO (NONSTANDARD COMMUNICATION INHIBITION FLAG k = 0) |
| S64 |
| CHANGE (NONSTANDARD COMMUNICATION INHIBITION FLAG←1) TO (NONSTANDARD COMMUNICATION INHIBITION FLAG k←1) |
| S38 |
| CHANGE (STANDARD COMMUNICATION COUNTER←0) TO (STANDARD COMMUNICATION COUNTER k←0) |
| S40 |
| CHANGE (COMMUNICATION ERROR COUNTER←0) TO (COMMUNICATION ERROR COUNTER k←0) |
| S48, S66 |
| CHANGE (NONSTANDARD COMMUNICATION COUNTER←NONSTANDARD COMMUNICATION COUNTER + 1) TO (NONSTANDARD COMMUNICATION COUNTER k←NONSTANDARD COMMUNICATION COUNTER k + 1) |
| S60 |
| CHANGE (STANDARD COMMUNICATION COUNTER ≧ 100) TO (STANDARD COMMUNICATION COUNTER k ≧ 100) |

FIG. 8

| |
|---|
| S62 |
| CHANGE (COMMUNICATION ERROR COUNTER ≧ 20) TO (COMMUNICATION ERROR COUNTER k ≧ 20) |
| S68 |
| CHANGE (COMMUNICATION ERROR COUNTER←COMMUNICATION ERROR COUNTER + 1) TO (COMMUNICATION ERROR COUNTER k ←COMMUNICATION ERROR COUNTER k + 1) |

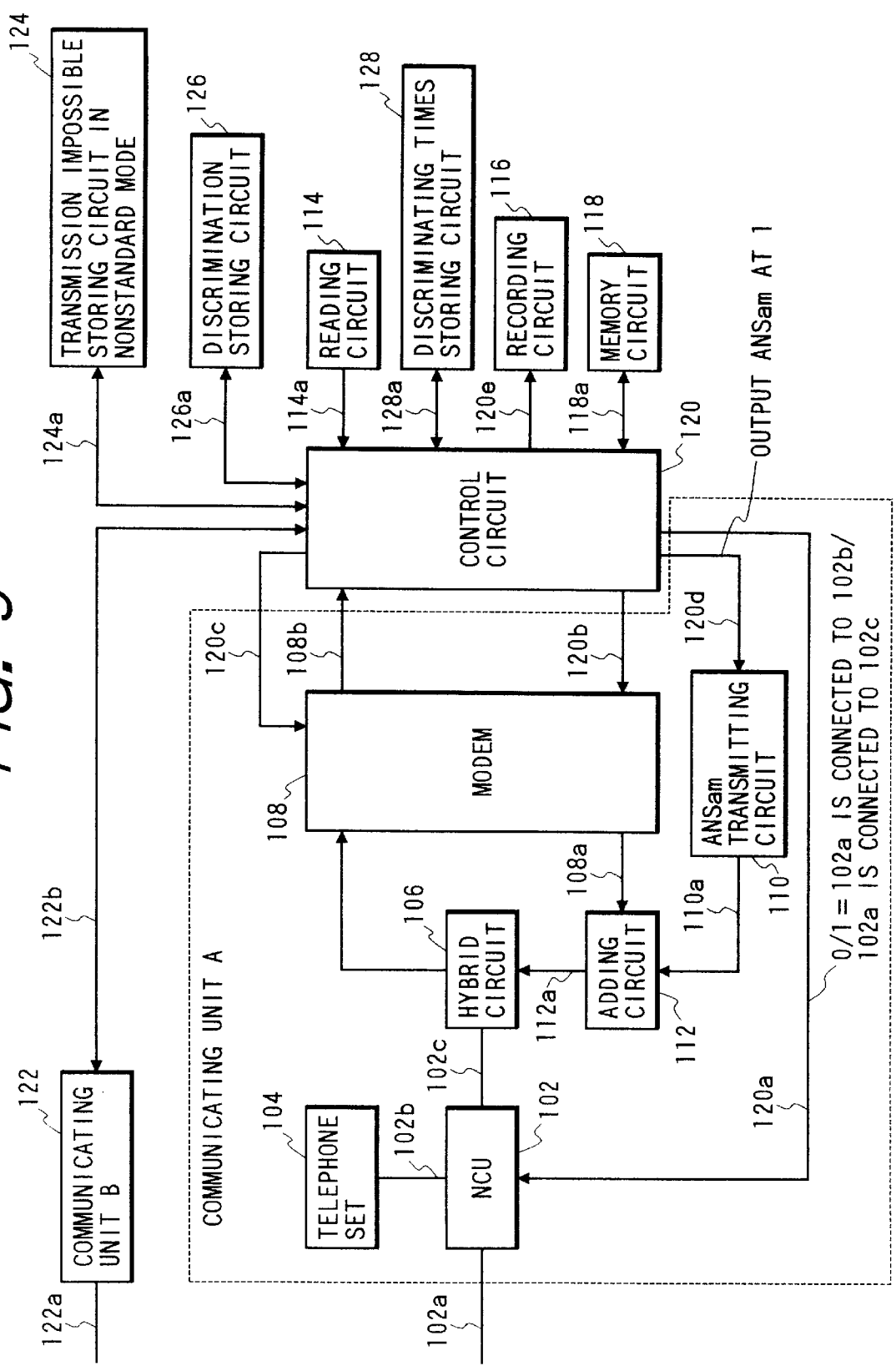

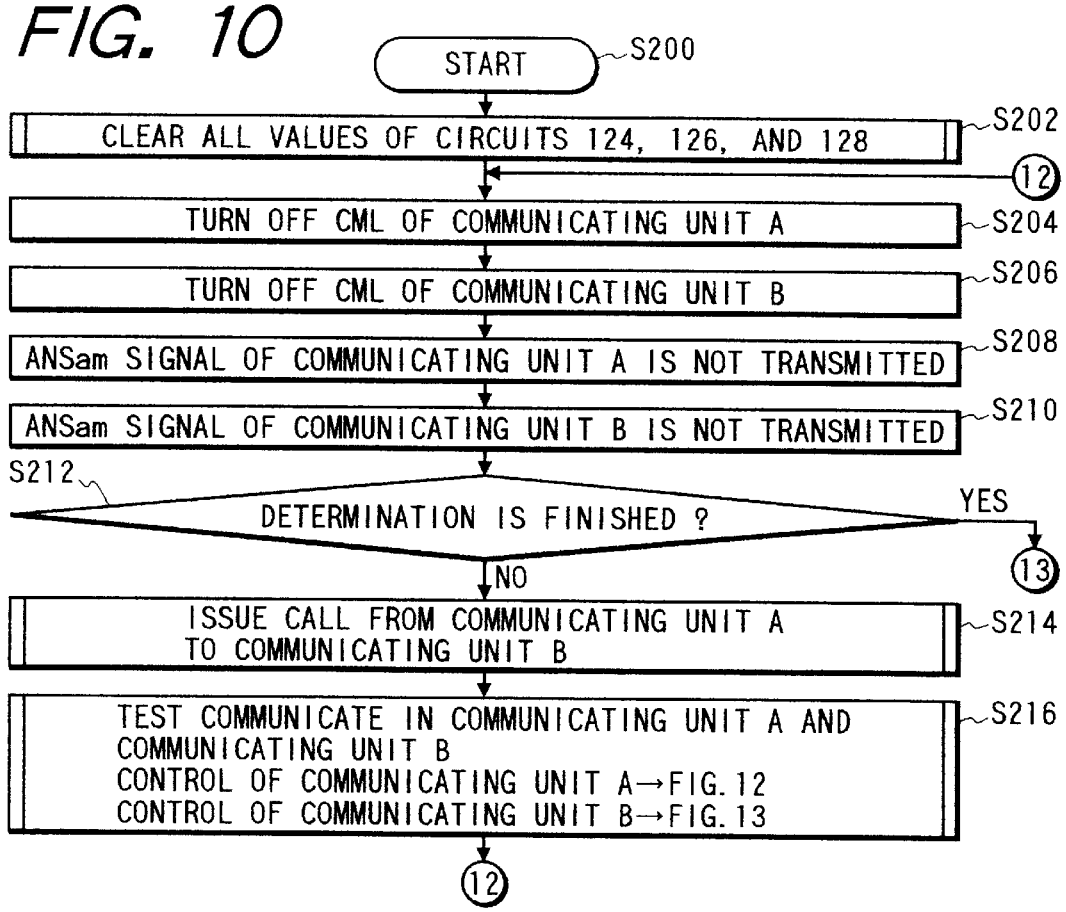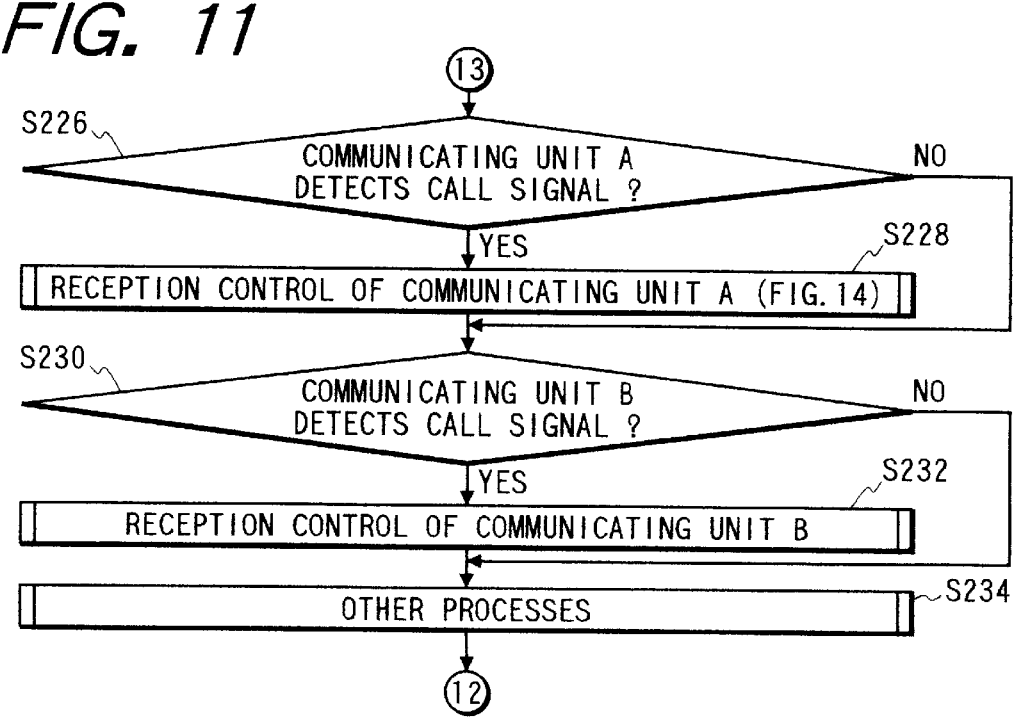

to be rendered.

FACSIMILE APPARATUS HAVING COMMUNICATING FUNCTION OF NONSTANDARD PROCEDURE AND COMMUNICATING FUNCTION OF STANDARD PROCEDURE

BACKGROUND OF THE INVENTION

1. Field of the Invention

The invention relates to a facsimile apparatus having a communicating function of a nonstandard procedure and a communicating function of a standard procedure.

2. Related Background Art

In a conventional facsimile communication, when a communication is performed between exchanges by using a digital line of, for example, 16 kb/sec, there exists a private communication system such that an analog modulated signal generated from a facsimile transmitter is once demodulated at the front stage of a transmission side exchange, thereby transmitting the signal as digital information on the digital line, and the signal is again modulated at an output stage of an exchange on the partner reception side, thereby transmitting the information as analog data to a facsimile receiver.

On the other hand, there has been proposed a facsimile apparatus such that at the time of detection of an NSF signal included in an initial identification signal, when a country code of FIF of the NSF signal is specified information, it is determined that the line is connected to a private exchange system, and a communication is performed at a specified transmitting speed which has been registered in correspondence to such a discrimination result (Japanese Patent Application No. 6-256720).

In the above-mentioned apparatus, since an exchange replaces the country code of the NSF signal to a country which does not exist, a nonstandard protocol is not performed.

There is such a private exchange that by breaking the NSF signal, a shift to the nonstandard protocol is not performed. This is because when a nonstandard signal passes, a peculiar error retransmission or the like is executed by the ARQ and a communication is impossible in a digital line of 16 kb/sec.

When the NSF signal is broken, there is a problem such that since the number of flags between the NSF signal and a CSI signal is often equal to 1 or 2, the receiver side cannot correctly receive CSI/DIS signals of the NSF/CSI/DIS signals, resulting in a pre-procedure error.

SUMMARY OF THE INVENTION

It is an object of the present invention to improve a facsimile apparatus in consideration of the foregoing problems.

Another object of the invention is to provide a facsimile apparatus such that in case of performing a communication through an exchange which does not pass a nonstandard signal, a communication error due to the transmission of the nonstandard signal is avoided and a valid communication can be assured.

The other objects of the present invention will become apparent from the following detailed description with reference to the accompanying drawings.

BRIEF DESCRIPTION OF THE DRAWINGS

FIG. 7 is an explanatory diagram showing a changed portion of the third embodiment for the first embodiment;

FIG. 8 is an explanatory diagram showing a changed portion of the third embodiment for the first embodiment;

FIG. 9 is a block diagram showing the fourth to sixth embodiments of the invention;

FIG. 10 is a flowchart showing the operation according to the fourth embodiment of the invention;

FIG. 11 is a flowchart showing the operation according to the fourth embodiment;

DETAILED DESCRIPTION OF THE PREFERRED EMBODIMENTS

Embodiments of the present invention will now be described in detail hereinbelow with reference to the drawings.

Figure 1:
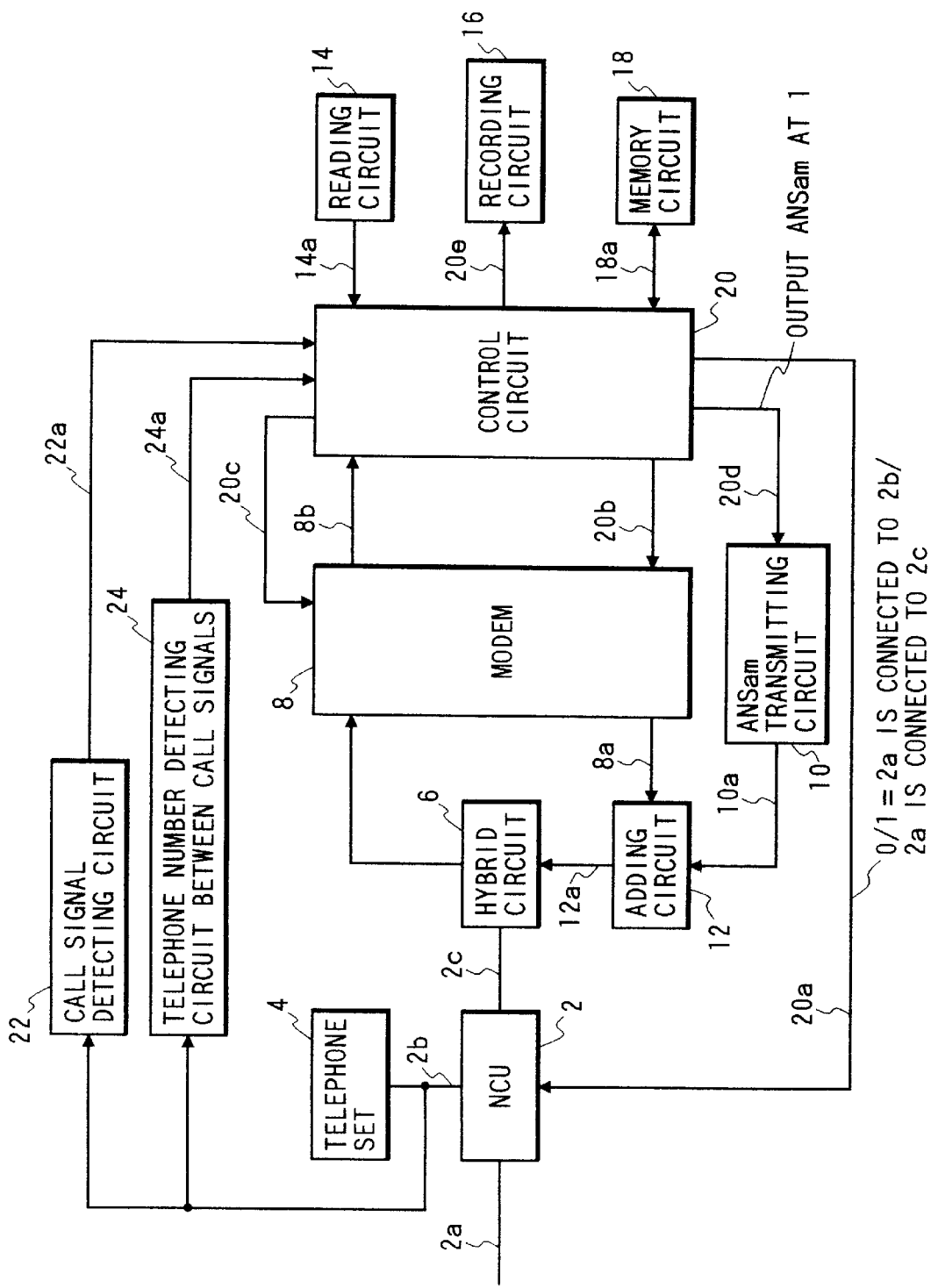
FIG. 1 is a block diagram showing the first to third embodiments of the invention.

FIG. 1 is a block diagram showing a construction of a facsimile apparatus according to the first to third embodiments of the invention.

In order to use a telephone line (telephone network) for a data communication or the like, an NCU (Network Control Unit) 2 connects the telephone line to a terminal equipment, the NCU 2 also performs a connection control of a telephone switching network performs a switching to a data communication line, and holds a loop. When a signal level (signal line 20a) from a control circuit 20 is equal to "0", the NCU 2 connects a telephone line 2a to a telephone 4 side. When the signal level is equal to "1", the NCU 2 connects the telephone line 2a to the facsimile apparatus side. In the normal state, the telephone line 2a is connected to the telephone 4 side.

A hybrid circuit 6 separates a signal of the transmitting system and a signal of the receiving system, transmits a transmission signal from an adding circuit 12 to the telephone line 2a via the NCU 2, receives a signal from the partner side via the NCU 2, and sends it to a modulator/demodulator(MODEM) 8 via a signal line 6a.

The MODEM 8 performs a modulation and a demodulation on the basis of ITU-T recommendation V.8, V.21, V.27ter, V.29, V.17, or V.34 and each transmission mode is designated by a signal line 20c. The MODEM 8 receives a signal outputted onto a signal line 20b, outputs modulated data to a signal line 8a, receives a reception signal outputted onto the signal line 6a, and outputs demodulated data to a signal line 8b.

An ANSam transmitting circuit 10 is a circuit to transmit an ANSam signal. When a signal of the signal level "1" is outputted to a signal line 20d, the ANSam transmitting circuit 10 transmits the ANSam signal to a signal line 10a. When a signal of the signal level "0" is outputted to the signal line 20d, the ANSam transmitting circuit 10 generates no signal to the signal line 10a.

The adding circuit 12 receives information on the signal line 8a and information on the signal line 10a and outputs an addition result to a signal line 12a. A reading circuit 14 reads an image of an original and outputs the read image data to a signal line 14a. A recording circuit 16 sequentially records information outputted onto a signal line 20e every line.

A memory circuit 18 is used to store raw or encoded information of the read data and to store the received information or decoded information or the like.

A call signal detecting circuit 22 is a circuit to detect a call signal. When the information of the signal line 2b is inputted and the call signal is detected, the call signal detecting circuit 22 generates a signal of the signal level "1" to a signal line 22a. When the call signal is not detected, the detecting circuit 22 generates a signal of the signal level "0" to the signal line 22a.

A telephone number detecting circuit 24 is a circuit to detect telephone numbers between the call signals. When the information on the signal line 2b is received and telephone number information between the call signals is detected, the detecting circuit 24 generates the telephone number information to a signal line 24a.

The control circuit 20 controls the whole facsimile apparatus of the embodiment. Particularly, in the first embodiment of the invention, in the case where the communication by the NSF signal as a nonstandard signal is not continuously established a predetermined number of times (for example, 100 times) and pre-procedure errors occur at a predetermined ratio (for example, 20 percent, namely, 20 communications) or more in the predetermined number of times of the communications, the control circuit 20 controls so as to perform the subsequent communication without transmitting the nonstandard signal.

Figure 2:
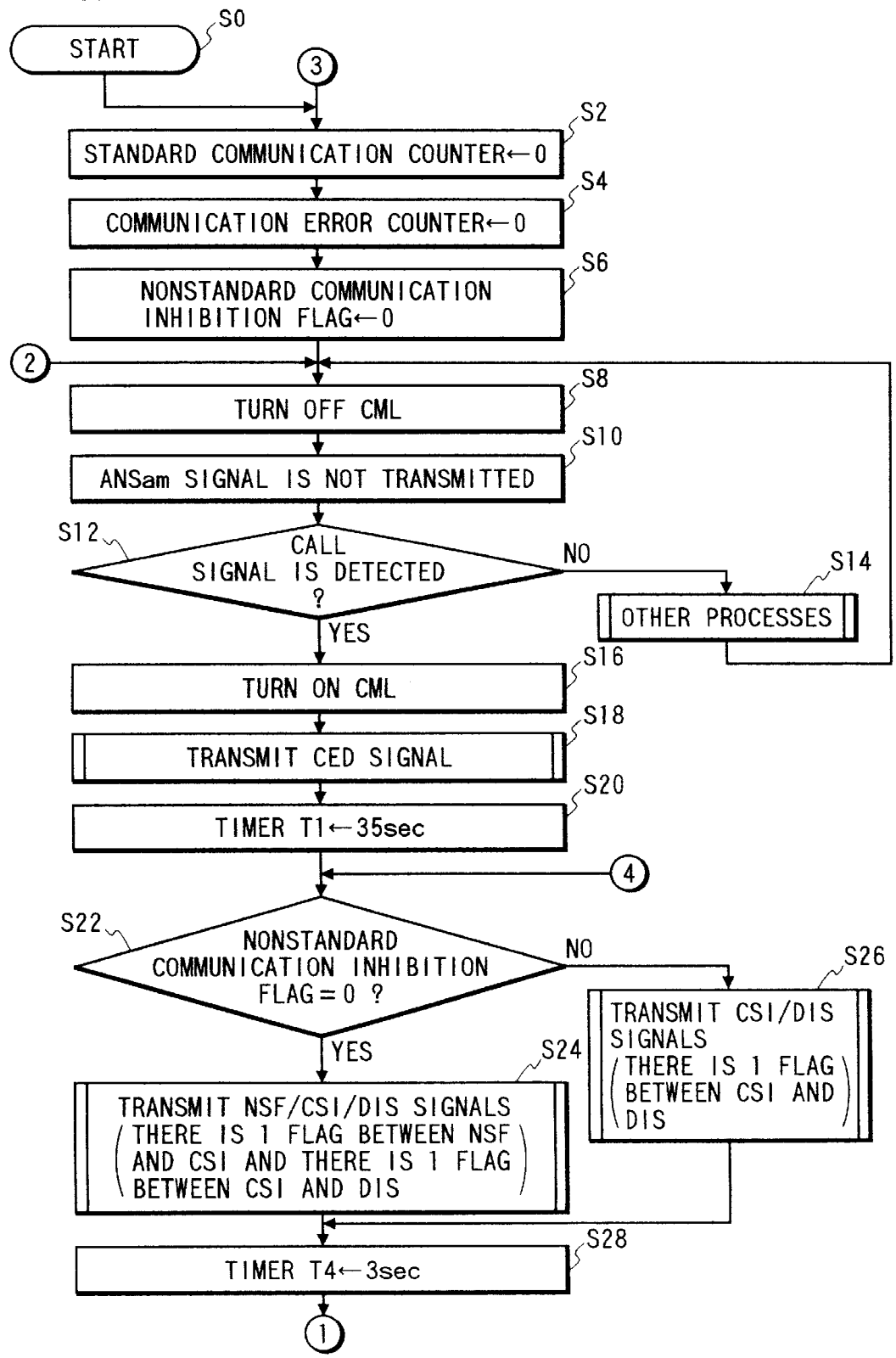
FIG. 2 is a flowchart showing the operation according to the first embodiment of the invention.
Figure 3:
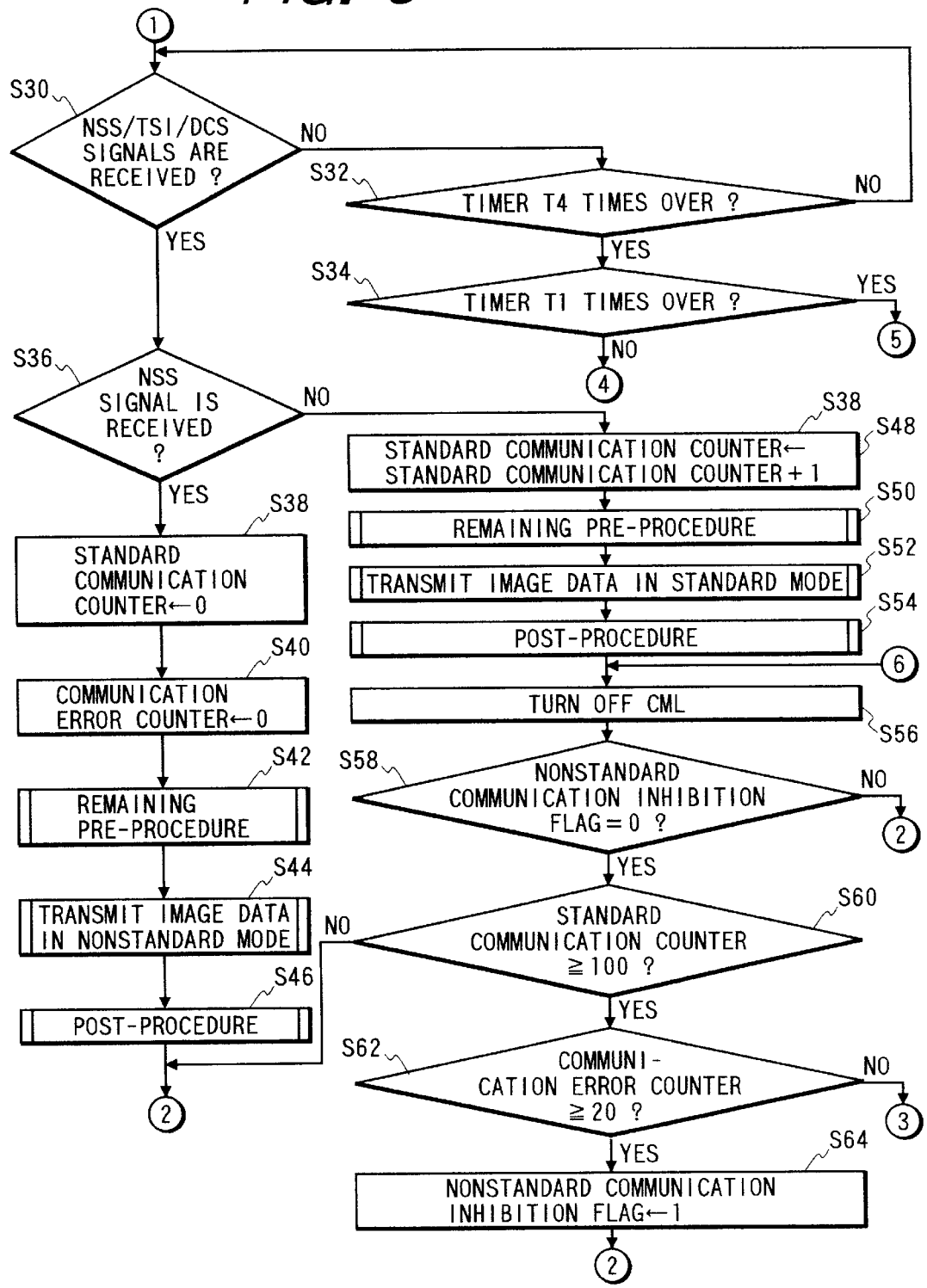
FIG. 3 is a flowchart showing the operation according to the first embodiment.
Figure 4:
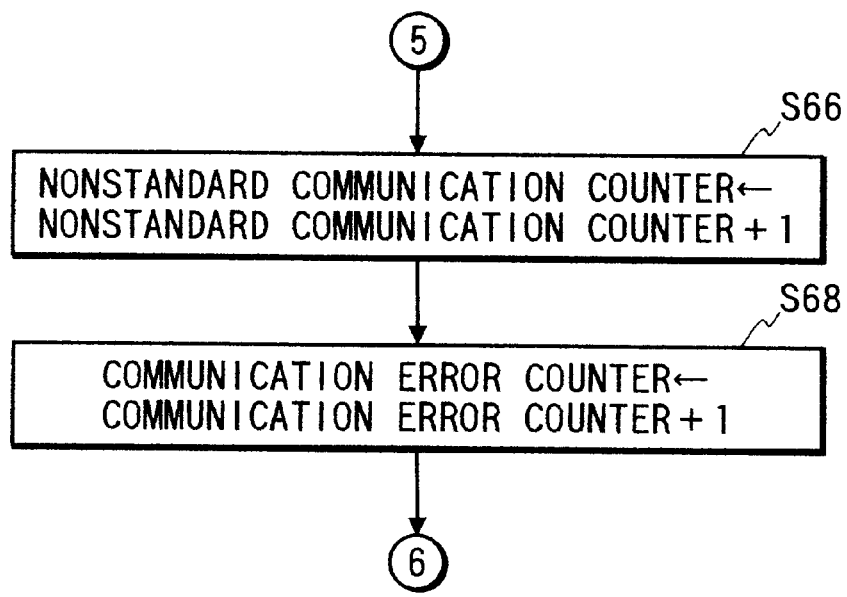
FIG. 4 is a flowchart showing the operation according to the first embodiment.

FIGS. 2 to 4 are flowcharts showing a flow of the control of the control circuit 20 in the first embodiment of the invention.

First, in FIG. 2, the operation is started in step S0. In step S2, a counter (hereinafter, referred to as a standard communication counter) to count the number of continuous communication times in the standard mode which is not the nonstandard mode is cleared.

In step S4, there is cleared a counter (hereinafter, referred to as a communication error counter) to count the number of times of communications in which pre-procedure errors occurred in the predetermined number of times of communications when the communication by the nonstandard signal is not continuously established a predetermined number of times (for example, 100 times).

In step S6, a nonstandard communication is inhibited. Specifically speaking, a flag (hereinafter, referred to as a nonstandard communication inhibition flag) indicating that the NSF signal is not transmitted at the time of call reception is cleared.

In step S8, a signal of the signal level "0" is outputted to the signal line 20a and the CML is turned off. In step S10, a signal of the signal level "0" is outputted to the signal line 20d, thereby setting into a state where the ANSam signal is not transmitted.

In step S12, by entering information of the signal line 22a a check is made to see if the call signal has been detected. When the call signal is detected, step S16 follows. When the call signal is not detected, step S14 follows and the other processes are executed.

In step S16, a signal of the signal level "1" is outputted to the signal line 20a and the CML is turned on. In step S18, a CED signal is transmitted. In step S20, a time of 35 seconds is set into a timer T1.

In step S22, a check is made to see if the nonstandard communication inhibition flag is equal to 0. When it is equal to 0, step S24 follows. When it is equal to 1, step S26 follows.

In step S24, the NSF/CSI/DIS signals are transmitted. It is now assumed that there is one flag between the NSF and the CSI and there is one flag between the CSI and the DIS. After that, step S28 follows.

In step S26, the CSI/DIS signals are transmitted. It is now assumed that there is one flag between the CSI and the DIS. After that, step S28 follows.

In step S28, a time of 3 seconds is set into a timer T4. In step S30, a check is made to see if the NSS/TSI/DCS signals have been received. When the NSS/TSI/DCS signals are received, step S36 follows. When the NSS/TSI/DCS signals are not received, step S32 follows.

In step S32, a check is made to see if the timer T4 has timed over. When it does not time over, step S30 follows. When it times over, step S34 follows.

In step S34, a check is made to see if the timer T1 has timed over. When it does not time over, step S22 follows. When it times over, step S66 follows.

In step S36, a check is made to see if the NSS signal has been received. When the NSS signal is received, step S38 follows. When the NSS signal is not received, step S48 follows.

In step S38, the standard communication counter is cleared. In step S40, the communication error counter is cleared. In step S42, the remaining pre-procedure is executed. In step S44, image data is transmitted in the nonstandard mode. In step S46, a post-procedure is executed and step S8 follows.

In step S48, a value of the standard communication counter is increased by 1. In step S50, the remaining pre-procedure is executed. In step S52, image data is transmitted in the standard mode. In step S54, a post-procedure is executed. In step S56, a signal of the signal level "0" is outputted to the signal line 20a and the CML is turned off.

In step S58, a check is made to see if the nonstandard communication inhibition flag is equal to 0. When it is equal to 0, step S60 follows. When it is equal to 1, step S8 follows.

In step S60, a check is made to see whether the count value of the standard communication counter is equal to or larger than 100 or not. When it is equal to or larger than 100, step S62 follows. When it is less than 100, step S8 follows.

In step S62, a check is made to see whether the count value of the communication error counter is equal to or larger than 20 or not. When it is equal to or larger than 20, step S64 follows and 1 is set into the nonstandard communication inhibition flag. When it is less than 20, step S2 follows.

In step S66, the value of the nonstandard communication counter is increased by 1. In step S68, the value of the communication error counter is increased by 1. After that, step S56 follows.

The second embodiment of the invention will now be described.

The second embodiment is characterized in that in the above first embodiment, when the communication in the nonstandard signal is not continuously established the predetermined number of times and pre-procedure errors occur at a predetermined ratio or more in the predetermined number of times of communications, the number of flags of the NSF signal and CSI signal is increased.

Figure 5:
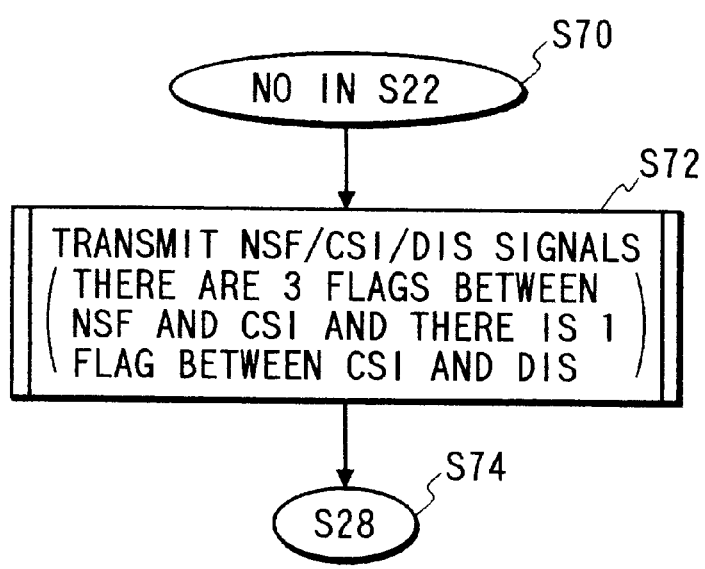
FIG. 5 is a flowchart showing the operation according to the second embodiment of the invention.

FIG. 5 is a flowchart showing a portion different from the first embodiment (FIGS. 2 to 4) in the control in the second embodiment.

In FIG. 5, step S70 shows N0 in step S22. In step S72, the NSF/CSI/DIS signals are transmitted. It is now assumed that there are three flags between the NSF and the CSI and there is one flag between the CSI and the DIS. After that, in step S74, the processing routine advances to step S28.

The third embodiment of the invention will now be described.

The third embodiment is characterized in that in the above first embodiment, by detecting telephone numbers which are transmitted between the call signals, the foregoing control is executed for each destination.

Figure 6:
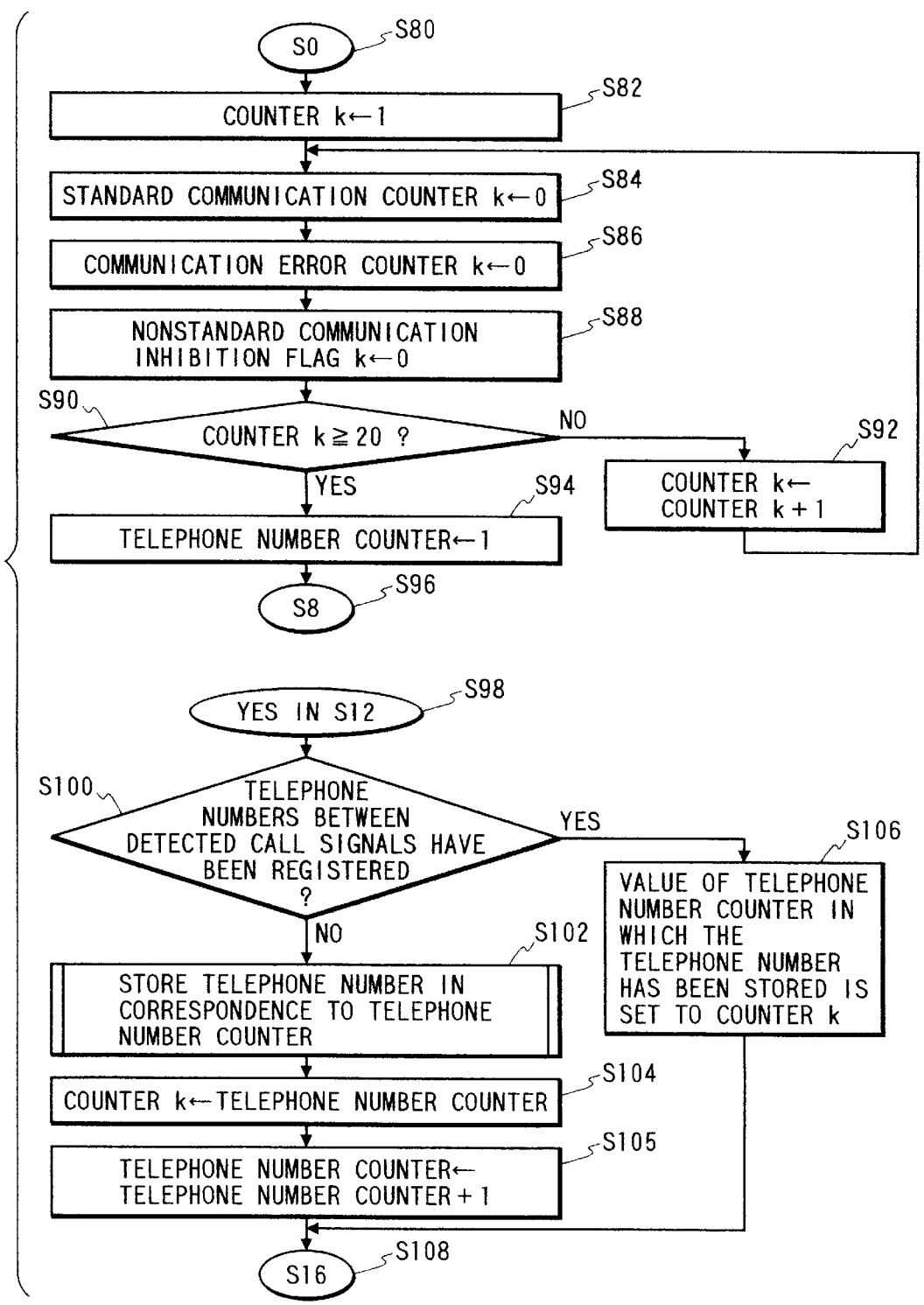
FIG. 6 is a flowchart showing the operation according to the third embodiment of the invention.

FIGS. 6 to 8 are flowcharts showing a portion different from the first embodiment (FIGS. 2 to 4) in the control in the third embodiment.

In FIG. 6, step S80 shows step S0. In step S82, 1 is set into a counter k. The number of telephone numbers which are detected between the call signals assumes 20 and the standard communication counter, communication error counter, and nonstandard communication inhibition flag are provided every destination. Therefore, k is added as a suffix to the end of each of them. It is now assumed that the destination is made correspond to the k by a telephone number counter.

In step S84, the standard communication counter k is cleared. In step S86, the communication error counter k is cleared. In step S88, the nonstandard communication inhibition flag k is cleared.

In step S90, a check is made to see whether the count value of the counter k is equal to or larger than 20 or not. When it is equal to or larger than 20, step S94 follows and 1 is set into the telephone number counter. In step S96, the processing routine advances to step S8. When the count value of the counter k is less than 20, step S92 follows and the value of the counter k is increased by 1. Step S84 follows.

Step S98 shows YES in step S12. In step S100, by entering the information of the signal line 24a a check is made to see if the detected telephone numbers between the call signals have been registered. If they have already been registered, step S106 follows and the value of the telephone number counter in which the telephone numbers have been stored is set into the counter k. When they are not yet registered, step S102 follows and the telephone numbers are stored in correspondence to the telephone number counter.

In step S104, the value of the telephone number counter is stored into the counter k. In step S105, the value of the telephone number counter is increased by 1. In step S108, the processing routine advances to step S16.

FIGS. 7 and 8 are tables showing that for each processing step including "the nonstandard communication inhibition flag" and "the communication error counter" in FIGS. 2 to 4 of the foregoing first embodiment, "the nonstandard communication inhibition flag" is replaced to "the nonstandard communication inhibition flag k" and "the communication error counter" is replaced to "the communication error counter k", respectively.

The fourth embodiment of the invention will now be described.

Hitherto, as a facsimile apparatus enclosing a plurality of lines, for example, as shown in the data communicating apparatus disclosed in JP-A-7-335827, an apparatus such that a call is issued from a line A toward a line B, a predetermined signal is transmitted and received and a value of ATT and a value of NL are determined and registered on the basis of the received information, has been proposed.

In such a facsimile apparatus, however, although the effective use of two lines has been considered, a detection about whether an exchanger passes the nonstandard signal or not is not performed. When the nonstandard signal is transmitted, in the exchanger through which the nonstandard signal does not pass, for example, the NSF signal is broken. In this case, the transmitter cannot receive not only the NSF signal but also the CSI signal and DIS signal, so that a communication error occurs.

In the embodiment, in the facsimile apparatus enclosing a plurality of lines, whether the exchanger through which the nonstandard signal does not pass or not is effectively discriminated, thereby enabling the communicating operation to be certainly performed.

FIG. 9 is a block diagram showing a construction of a facsimile apparatus according to the fourth to sixth embodiments of the invention.

In order to use a telephone line (telephone network) for a data communication or the like, an NCU (network control unit) 102 connects a terminal. The NCU 102 also performs a connection control of a telephone switching network, performs a switching to a data communication line and holds a loop. When the signal level (signal line 120a) from a control circuit 120 is equal to "0", the NCU 102 connects a telephone line 102a to the telephone 104 side. When the signal level is equal to "1", the NCU 102 connects the telephone line 102a to the facsimile apparatus side. In the normal state, the telephone line 102a is connected to the telephone 104 side.

A hybrid circuit 106 separates a signal of the transmitting system and a signal of the receiving system, sends a transmission signal from an adding circuit 112 to the telephone line 102a via the NCU 102, receives a signal from the partner side via the NCU 102, and transmits it to a modulator/demodulator (MODEM) 108 via a signal line 106a.

The MODEM 108 executes a modulation and a demodulation on the basis of the ITU-T recommendation V.8, V.21, V.27ter, V.29, V.17, and V.34 and each transmission mode is designated by a signal line 120c. The MODEM 108 receives a signal outputted onto a signal line 120b, outputs modulated data to a signal line 108a, receives a reception signal outputted onto the signal line 106a, and outputs demodulated data to a signal line 108b.

An ANSam transmitting circuit 110 is a circuit to transmit the ANSam signal. When a signal of the signal level "1" is outputted to a signal line 120d, the ANSam transmitting circuit 110 transmits the ANSam signal to a signal line 110a. When a signal of the signal level "0" is outputted to the signal line 120d, the transmitting circuit 110 outputs no signal to the signal line 110a.

The adding circuit 112 inputs both of the information of the signal line 108a and the information of the signal line 110a and outputs an addition result onto a signal line 112a.

The foregoing NCU 102, telephone 104, hybrid circuit 106, MODEM 108, ANSam transmitting circuit 110, and adding circuit 112 construct a communicating unit A and the foregoing telephone line 102a is enclosed.

Reference numeral 122 denotes a communicating unit B and has a construction similar to that of the communicating unit A. The communicating unit B encloses a telephone line 122a. Further, it is assumed that a signal line 122b in the communicating unit B includes signal lines corresponding to the signal lines 120a, 120b, 120c, 120d, and 108b of the communicating unit A.

A reading circuit 114 subsequently reads an image of the original and outputs the read image data to a signal line 114a. A recording circuit 116 sequentially records the information outputted onto a signal line 120e every line.

A memory circuit 118 is used to store raw or encoded information information of the read data and to store received information or decoded information, or the like.

A storing circuit 124 is a storing circuit to store information indicating that the exchanger to which the facsimile apparatus is connected does not transmit the nonstandard signal, and the reading and writing operations are performed through a signal line 124a. When storage information is equal to 0, this means that the exchanger transmits the nonstandard signal. When the storage information is equal to 1, this means that the exchanger does not transmit the nonstandard signal.

A storing circuit 126 is a circuit to store a discrimination result about whether the exchanger to which the facsimile apparatus is connected transmits the nonstandard signal by using two lines of the self apparatus or not, and the reading and writing operations are executed through a signal line 126a. When storage information is equal to 0, this means that it is not discriminated that the exchanger transmits the nonstandard signal. When the storage information is equal to 1, this means that the discrimination is finished.

A storing circuit 128 is a circuit to count the number of times of communication which are executed in order to discriminate whether the exchanger to which the facsimile apparatus is connected transmits the nonstandard signal by using two lines of the self apparatus, and the reading and writing operations are executed through a signal line 128a. Information indicating a discrimination result about the completion of the discrimination is stored into the storing circuit 126. The result at the end of the discrimination is stored into the storing circuit 124.

The control circuit 120 controls the whole facsimile apparatus of the embodiment. Particularly, in the embodiment, the control circuit 120 controls in a manner such that the self apparatus issues a call from the communicating unit A to the communicating unit B and, in the communicating unit B on the call reception side, the NSF signal is transmitted, and when the NSF signal cannot be detected in the communicating unit A on the call originating side, it is decided that the transmission of the nonstandard signal is impossible, and in the subsequent call reception, the NSF signal is not transmitted.

FIGS. 10 to 14 are flowcharts showing a flow of the control of the control circuit 120 in the fourth embodiment.

In FIG. 10, the operation is started in step S200. In step S202, values in the storing circuits 124, 126, and 128 are cleared through the signal lines 124a, 126a, and 128a, respectively.

In step S204, a signal of the signal level "0" is outputted to the signal line 120a and the CML of the communicating unit A is turned off. In step S206, the CML in the communicating unit B is turned off in a manner similar to step S204.

In step S208, a signal of the signal level "0" is outputted to the signal line 120d, thereby setting into a state where the ANSam signal in the communicating unit A is not transmitted. In step S210, the apparatus is set into a state where the ANSam signal in the communicating unit B is not transmitted in a manner similar to step S208.

In step S212, a check is made to see if the connected exchanger can transmit the nonstandard signal, specifically speaking, whether the value in the storing circuit 126 is equal to 1 or not. When this discrimination is finished, step S226 follows. When the discrimination is not finished, step S214 follows.

Figure 12:
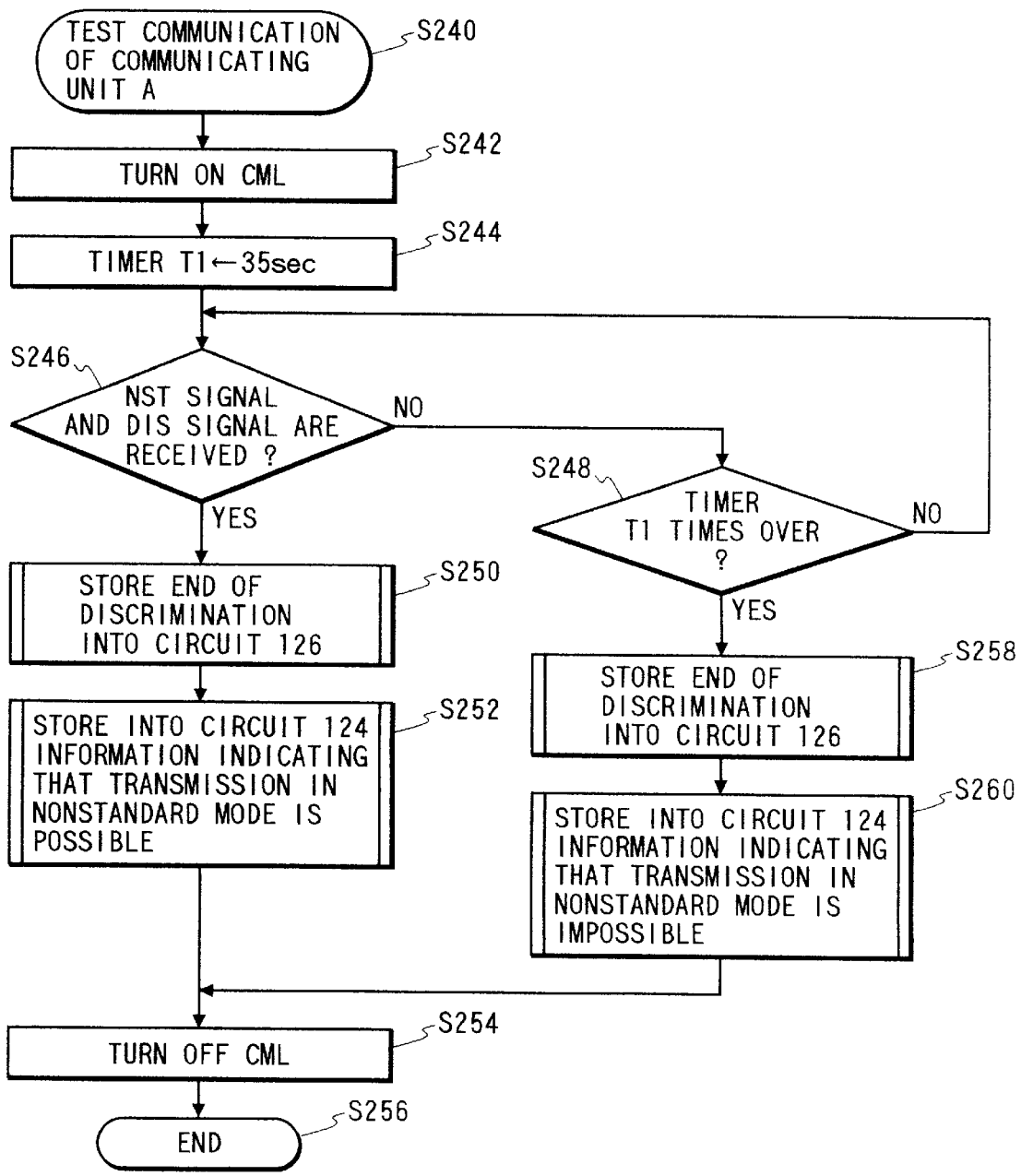
FIG. 12 is a flowchart showing the operation according to the fourth embodiment.
Figure 13:
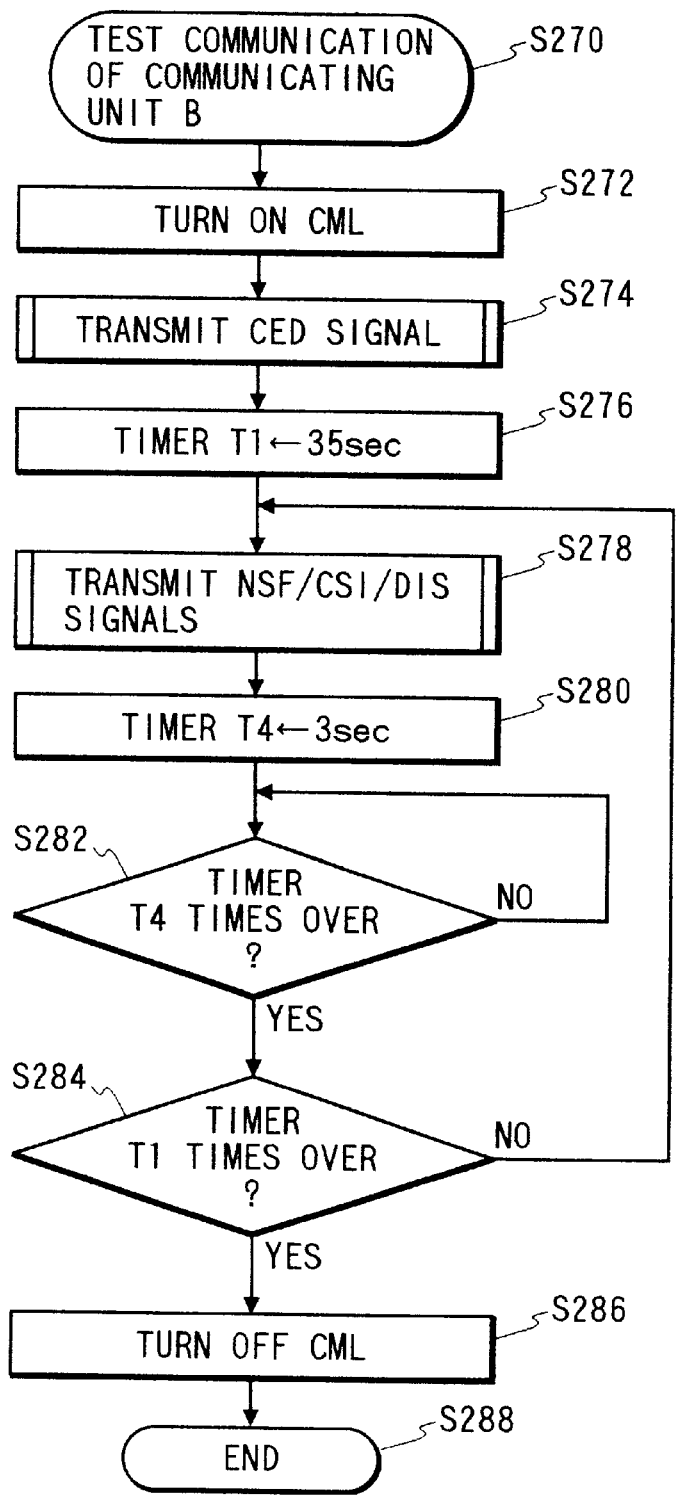
FIG. 13 is a flowchart showing the operation according to the fourth embodiment.

In step S214, a call is originated from the communicating unit A toward the communicating unit B. In step S216, a test communication is performed between the communicating unit A and communicating unit B. Processes in the communicating units A and B are executed in a dual manner. FIG. 12 shows a control of the communicating unit A. FIG. 13 shows a control of the communicating unit B. The contents of those controls will be described hereinlater.

Figure 14:
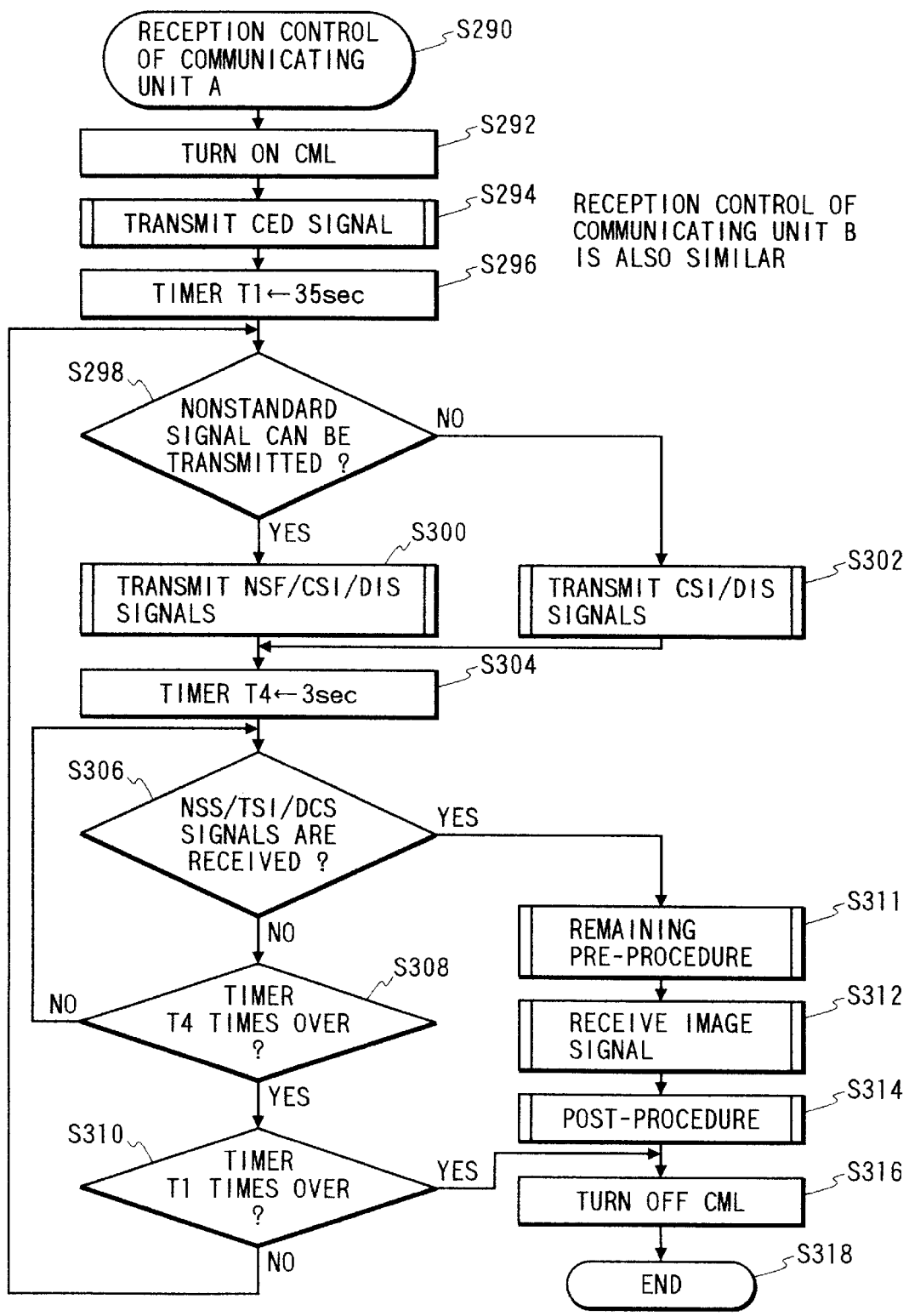
FIG. 14 is a flowchart showing the operation according to the fourth embodiment.

In step S226, a check is made to see if the communicating unit A has detected the call signal. When the call signal is detected, step S228 follows and a reception control of the communicating unit A shown in FIG. 14 is executed. When the call signal is not detected, step S230 follows.

In step S230, a check is made to see if the communicating unit B has detected the call signal. When the call signal is detected, step S232 follows and a reception control of the communicating unit B is executed. When the call signal is not detected, step S234 follows and the other process is performed. The processes in steps S228, S232, and S234 are time-divisional processes and are simultaneously executed in a time divisional manner.

FIG. 12 shows the test communication (S240) of the communicating unit A in step S216.

First in step S242, a signal of the signal level "1" is outputted to the signal line 120a and the CML is turned on. In step S244, a time of 35 seconds is set into the timer T1.

In step S246, a check is made to see if the NSF signal and the DIS signal have been received. When the NSF signal and the DIS signal are received, step S250 follows. When the NSF signal and the DIS signal are not received, step S248 follows.

In step S248, a check is made to see if the timer T1 has timed over. When it times over, step S258 follows. When it does not time over, step S246 follows.

In step S250, 1 is stored into the storing circuit 126 through the signal line 126a and the end of discrimination is stored. In step S252, 1 is stored into the storing circuit 124 through the signal line 124a and the exchanger stores information indicating that the nonstandard signal can be transmitted.

After that, in step S254, a signal of the signal level "0" is outputted to the signal line 120a and the CML is turned off. The processing routine is finished in step S256.

On the other hand, in step S258, 1 is stored into the storing circuit 126 through the signal line 126a and the end of discrimination is stored. In step S260, 0 is stored into the storing circuit 124 through the signal line 124a and the exchanger stores information indicating that the nonstandard signal cannot be transmitted.

FIG. 13 executes the test communication (S270) of the communicating unit B in step S216.

First in step S272, the CML of the communicating unit B is turned on. In step S274, the CED signal is transmitted. In step S276, a time of 35 seconds is set into the timer T1. In step S278, the NSF/CSI/DIS signals are transmitted.

In step S280, a time of 3 seconds is set into the timer T4. In step S282, a check is made to see if the timer T4 has timed over. When it times over, step S284 follows.

In step S284, a check is made to see if the timer T1 has timed over. When it does not time over, step S278 follows. When it times over, step S286 follows. In step S286, the CML of the communicating unit B is turned off. The processing routine is finished in step S288.

FIG. 14 shows a reception control (S290) of the communicating unit A in step S228.

First in step S292, a signal of the signal level "1" is outputted to the signal line 120a and the CML is turned on. In step S294, the CED signal is transmitted. In step S296, a time of 35 seconds is set into the timer T1.

In step S298, a check is made to see whether the information of the storing circuit 124 has been inputted and the exchanger can transmit the nonstandard signal or not. If the exchanger can transmit the non standard signal, step S300 follows and the NSF/CSI/DIS signal s are transmitted. Step S304 follows . When the exchanger cannot transmit the nonstandard signal, step S302 follows and the CSI/DIS signals are transmitted. Step S304 follows.

In step S304, a time of 3 seconds is set into the timer T4. In step S306, a check is made to see if the NSS/TSI/DCS signals have been received. When they are received, step S311 follows. When they are not received, step S308 follows.

In step S308, a check is made to see if the timer T4 has timed over. When it times over, step S310 follows. When it does not time over, step S306 follows.

In step S310, a check is made to see if the timer T1 has timed over. When it times over, step S316 follows. When it does not time over, step S298 follows.

A remaining pre-procedure, the reception of an image signal, and a post-procedure are sequentially executed in steps S311, S312, and S314, respectively. In step S316, a signal of the signal level "0" is outputted to the signal line 120a and the CML is turned off. The processing routine is finished in step S318.

Since a reception control of the communicating unit B in step S232 is also substantially the same as the control of FIG. 14 except that the apparatus operates by using each section of the communicating unit B, its description is omitted.

The fifth embodiment of the invention will now be described.

The fifth embodiment is characterized in that in the above fourth embodiment, when a state in which the nonstandard signal cannot be detected on the originating side continues for predetermined times of communications (for example, two communications), the exchanger connected to the facsimile apparatus determines that the transmission of the nonstandard signal is impossible.

Figure 15:
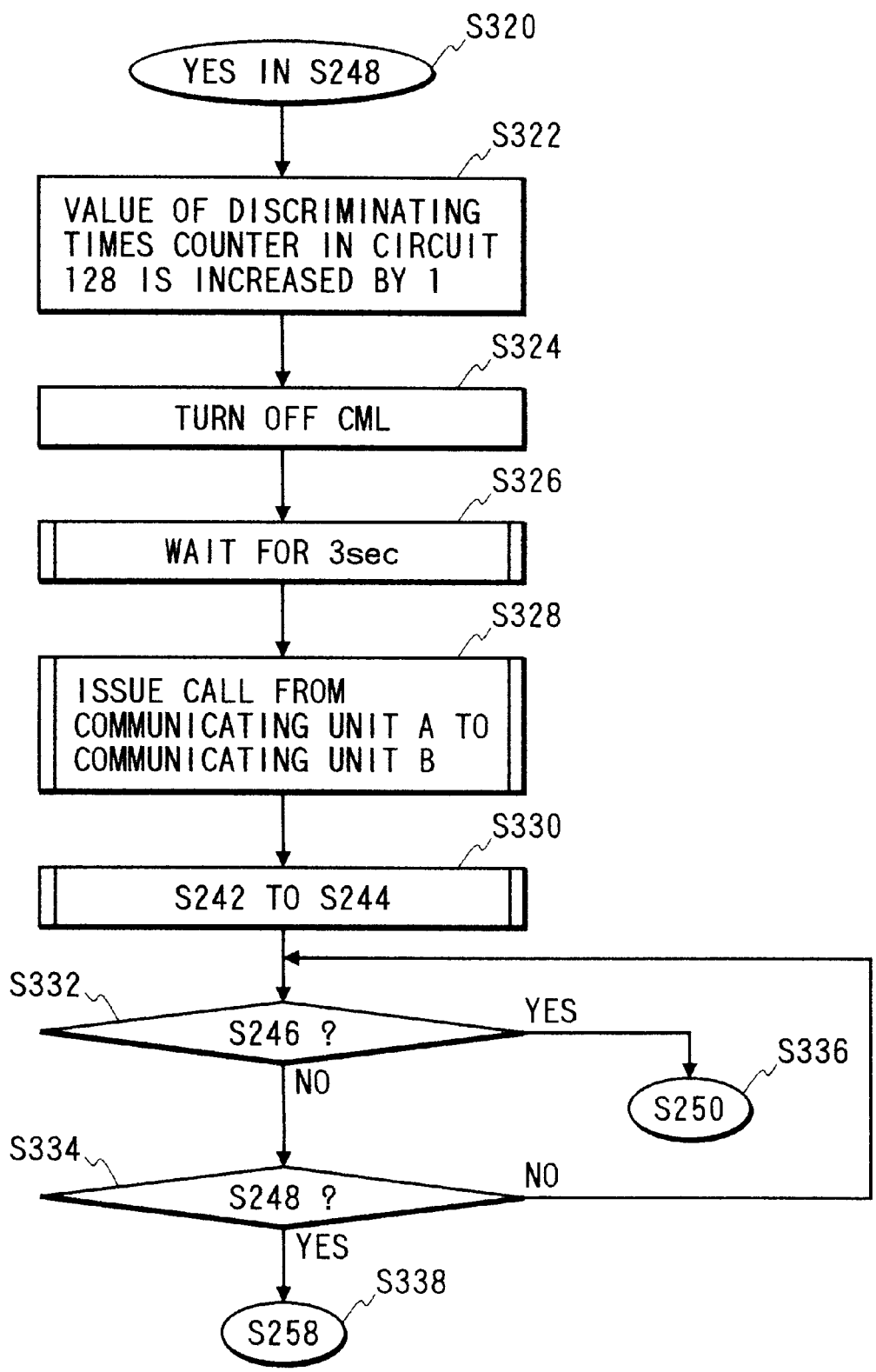
FIG. 15 is a flowchart showing the operation according to the fifth embodiment of the invention.

FIG. 15 is a flowchart showing a portion different from the fourth embodiment (FIGS. 10 to 14) in the control of the fifth embodiment.

First, step S320 shows YES in step S248. In step S322, a count value of a discriminating times counter of the storing circuit 128 is increased by 1 through the signal line 128a.

In step S324, a signal of the signal level "0" is outputted to the signal line 120a and the CML is turned off. In step S326, the apparatus waits for three seconds. In step S328, a call is issued from the communicating unit A toward the communicating unit B. In step S330, the CML is turned on and a time of 35 seconds is set into the timer T1.

In step S332, when the NSF signal and the DIS signal are received, step S336 (S250) follows. When the NSF signal and the DIS signal are not received, step S334 follows.

In step S334, when the timer T1 times over, step S338 (S258) follows. When it does not time over, step S332 follows.

The sixth embodiment of the invention will now be described.

In the fourth embodiment, the nonstandard signal is not transmitted at the time of reception after it was decided that the transmission of the nonstandard signal is impossible. In the embodiment, however, when the nonstandard signal from the partner apparatus is received at the originating time in this state, the decision that the transmission of the nonstandard signal is impossible is deleted. Information about whether the exchanger can transmit the nonstandard signal or not is again registered on the basis of the first embodiment.

Figure 16:
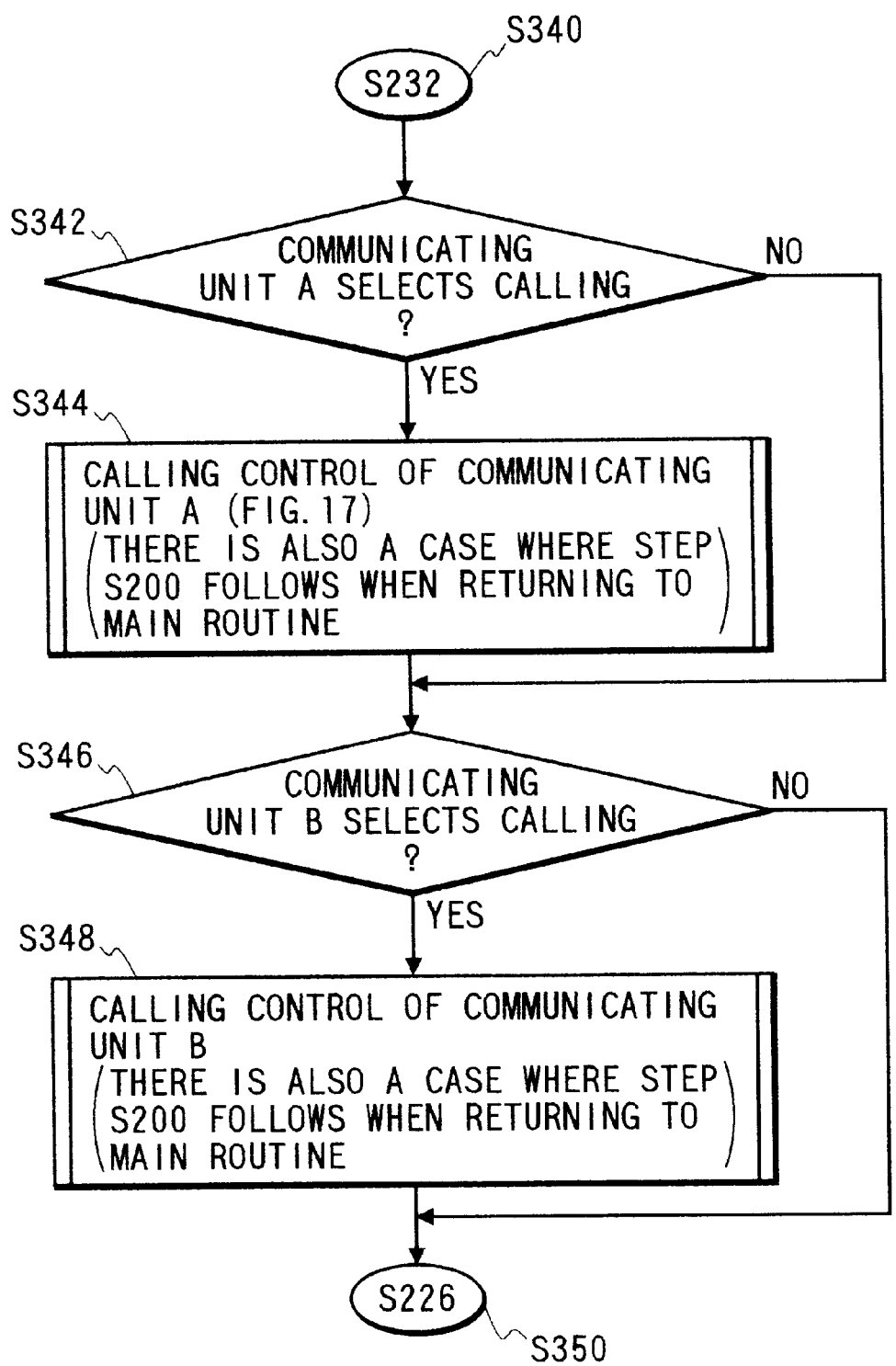
FIG. 16 is a flowchart showing the operation according to the sixth embodiment of the invention.

FIG. 16 is a flowchart showing a portion different from the fourth embodiment (FIGS. 10 to 14) in the control of the sixth embodiment.

Figure 17:
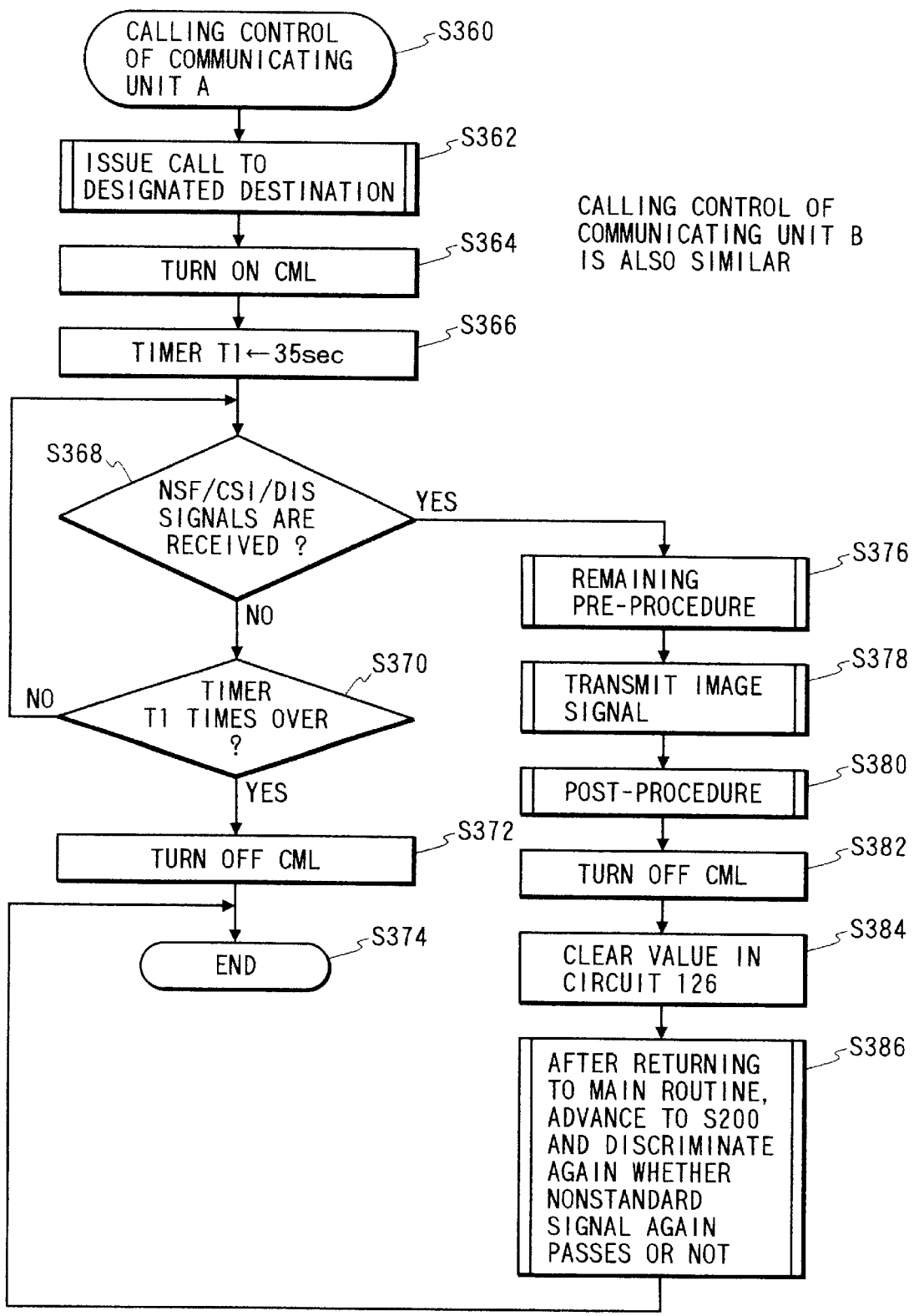
FIG. 17 is a flowchart showing the operation according to the sixth embodiment.

First, step S340 shows step S232. In step S342, a check is made to see if the communicating unit A has selected "calling" (issuance of call). When it is selected, step S344 follows and a calling control of the communicating unit A shown in FIG. 17 is performed. When it is not selected, step S346 follows.

In step S346, a check is made to see if the communicating unit B has selected the "calling". When it is selected, step S348 follows and a calling control of the communicating unit B is performed. When it is not selected, step S350 (S226) follows.

Steps S344 and S348 relate to a case of progressing step S200 when the processing routine is returned to the main routine.

FIG. 17 shows a calling control (S360) of the communicating unit A in step S344.

First in step S362, a call is originated to the designated destination. In step S364, a signal of the signal level "1" is outputted to the signal line 120a and the CML is turned on. In step S366, a time of 35 seconds is set into the timer T1.

In step S368, a check is made to see if the NSF/CSI/DIS signals have been received. When they are received, step S376 follows. When they are not received, step S370 follows.

In step S370, a check is made to see if the timer T1 has timed over. When it times over, step S372 follows. When it does not time over, step S368 follows.

In step S372, a signal of the signal level "0" is outputted to the signal line 120a and the CML is turned off. The processing routine is finished in step S374.

A remaining pre-procedure, a transmission of an image signal, and a post-procedure are sequentially executed in steps S376, S378, and S380, respectively. In step S382, a signal of the signal level "0" is outputted to the signal line 120a and the CML is turned off.

In step S384, the value in the storing circuit 126 is cleared through the signal line 126a. The processing routine is finished in step S374.

In step S386, after the processing routine was returned to the main routine, step S200 follows and a check is again made to see if the exchanger can again transmit the nonstandard signal.

Since a calling control of the communicating unit B in step S348 is also similar to the control of FIG. 17 except that the operation is performed by each section in the communicating unit B, its description is omitted.

According to the embodiment as mentioned above, when the facsimile apparatus is connected to the private exchanger and does not perform the nonstandard communication because the NSF signal and the like are broken by the exchanger, in a case where the partner apparatus cannot receive the CSI/DIS signals and a pre-procedure error occurs, the facsimile apparatus does not transmit the nonstandard signal such as an NSF signal or the like, so that it can certain perform the communication.

When the terminal on the calling side is connected to the private exchanger, the first and second inventions can be applied every destination and the nonstandard communication from the terminal on the calling side where it is not connected to the private exchanger can be performed.

When the facsimile apparatus is connected to the private exchanger and does not perform the nonstandard communication because the NSF signal is broken in the exchanger, in a case where the partner apparatus cannot receive the CSI/DIS signals and a pre-procedure error occurs, the error is extinguished in the facsimile pre-procedure and the nonstandard communication can be performed to the destination which can execute the nonstandard communication.

By communicating by using another line enclosed in the self apparatus, whether the exchanger can transmit the nonstandard signal or not can be discriminated and a proper process can be performed. Therefore, a ratio of communication errors when the exchanger cannot transmit the nonstandard signal can be remarkably reduced.

Whether the exchanger can transmit the nonstandard signal or not can be further accurately discriminated.

When the exchanger cannot transmit the nonstandard signal, since the NSF signal is not transmitted, a situation that an error occurs because the exchanger breaks the NSF signal is eliminated and the communication errors can be remarkably reduced.

When the NSF signal from the partner receiver is received after it was decided that the exchanger could not transmit the nonstandard signal, such a discrimination can be again performed by using a plurality of lines of the self apparatus. For example, even in the case where it is determined by a misunderstanding that the exchanger cannot transmit the nonstandard signal, a misunderstanding state can be promptly released.

The present invention is not limited to the foregoing embodiments but many modifications and variations are possible within the spirit and scope of the appended claims of the invention.

What is claimed is:

1. A facsimile apparatus that performs communication functions of a nonstandard procedure and a standard procedure, said apparatus comprising:
   a first detector adapted to detect which of a communication by the nonstandard procedure and a communication by the standard procedure has been established;
   a second detector adapted to detect whether or not a pre-procedure error occurs in a respective pre-procedure before each communication of image data; and
   a controller adapted to inhibit a transmission process of a signal of the nonstandard procedure in a subsequent communication in a case where said first detector detects that communication by the nonstandard procedure is not continuously established for a predetermined number of consecutive communications and said second detector detects that pre-procedure errors occur at at least a predetermined ratio in the predetermined number of consecutive communications.

2. An apparatus according to claim 1, wherein the signal of the nonstandard procedure is an NSF signal of the T.30 recommendation.

3. An apparatus according to claim 1, further comprising:
   a third detector adapted to detect an identification information signal of a calling side, which is transmitted for a period of time between call signals from a line,
   wherein said controller selects whether a signal of the nonstandard procedure is transmitted or not in accordance with the calling side corresponding to the identification signal detected by said third detector.

4. A communication method in a facsimile apparatus that performs communication functions of a nonstandard procedure and a standard procedure and that can be connected to a plurality of lines, said method comprising the steps of:
   transmitting a signal of the nonstandard procedure from a first line of the plurality of lines to a second line of the plurality of lines; and
   inhibiting all of the plurality of lines from transmitting a signal of the nonstandard procedure in a subsequent transmission, if the second line of the plurality of lines cannot receive the signal of the nonstandard procedure transmitted from the first line of the plurality of lines, while allowing all of the plurality of lines to transmit a signal of the nonstandard procedure in a subsequent transmission, if the second line of the plurality of lines can receive the signal of the nonstandard procedure transmitted from the first line of the plurality of lines.

5. A method according to claim 4, wherein, in a case where a signal of the nonstandard procedure cannot be detected a predetermined number of times, transmission of a signal of the nonstandard procedure is inhibited.

6. A method according to claim 5, wherein, when a signal of the nonstandard procedure from a partner apparatus is received in a communication after inhibition of transmission of a signal of the nonstandard procedure, the inhibition is released.

7. A facsimile apparatus that performs communication functions of a nonstandard procedure and a standard procedure, said apparatus comprising:
   a first detector adapted to detect which of a communication by the nonstandard procedure and a communication by the standard procedure has been established;
   a second detector adapted to detect whether or not a pre-procedure error occurs in a respective pre-procedure before each communication of image data; and
   a controller adapted to change a number of flags between a nonstandard procedure signal and a standard procedure signal in a subsequent communication in a case where said first detector detects that communication by the nonstandard procedure is not continuously established for a predetermined number of consecutive communications and said second detector detects that pre-procedure errors occur at at least a predetermined ratio in the predetermined number of consecutive communications.

8. An apparatus according to claim 9, wherein the nonstandard procedure signal is an NSF signal of the T.30 recommendation.

9. An apparatus according to claim 8, wherein said controller sets the number of flags between the NSF signal and a CSI signal of the T.30 recommendation to a plural number.

10. An apparatus according to claim 8, wherein said controller increases the number of flags between the NSF signal and a CSI signal of the T.30 recommendation.

11. A facsimile communication method of performing communication functions of a nonstandard procedure and a standard procedure, said method comprising:

a first detection step of detecting which of a communication by the nonstandard procedure and a communication by the standard procedure has been established;

a second detection step of detecting whether or not a pre-procedure error occurs in a respective pre-procedure before each communication of image data; and a control step of inhibiting a transmission process of a signal of the nonstandard procedure in a subsequent communication in a case where said first detection step detects that communication by the nonstandard procedure is not continuously established for a predetermined number of consecutive communications and said second detection step detects that pre-procedure errors occur at at least a predetermined ratio in the predetermined number of consecutive communications.

12. A method according to claim 11, wherein the signal of the nonstandard procedure is an NSF signal of the T.30 recommendation.

13. A method according to claim 11, further comprising:

a third detection step of detecting an identification information signal of a calling side which is transmitted for a period of time between call signals from a line, wherein said control step selects whether a signal of the nonstandard procedure is transmitted or not in accordance with the calling side corresponding to the identification signal detected in said third detection step.

14. A facsimile communication method that performs communication functions of a nonstandard procedure and a standard procedure, said method comprising:

a first detection step of detecting which of a communication by the nonstandard procedure and a communication by the standard procedure has been established;

a second detection step of detecting whether or not a pre-procedure error occurs in a respective pre-procedure before each communication of image data; and a control step of changing a number of flags between a nonstandard procedure signal and a standard procedure signal in a subsequent communication in a case where said first detection step detects that communication by the nonstandard procedure is not continuously established for a predetermined number of consecutive communications and said second detection step detects that pre-procedure errors occur at at least a predetermined ratio in the predetermined number of consecutive communications.

15. A method according to claim 14, wherein the signal of the nonstandard procedure is an NSF signal of the T.30 recommendation.

16. A method according to claim 15, wherein said control step sets the number of flags between the NSF signal and a CSI signal of the T.30 recommendation to a plural number.

17. A method according to claim 15, wherein said control step increases the number of flags between the NSF signal and a CSI signal of the T.30 recommendation.

18. A facsimile communication apparatus that performs communication functions of a nonstandard procedure and a standard procedure and that can be connected to a plurality of lines, said apparatus comprising:

a signal transmitter adapted to transmit a signal of the nonstandard procedure from a first line of the plurality of lines to a second line of the plurality of lines; and a controller adapted to inhibit all of the plurality of lines from transmitting a signal of the nonstandard procedure in a subsequent transmission, if the second line of the plurality of lines cannot receive the signal of the nonstandard procedure transmitted from the first line of the plurality of lines, while allowing all of the plurality of lines to transmit a signal of the nonstandard procedure in a subsequent transmission, if the second line of the plurality of lines can receive the signal of the nonstandard procedure transmitted from the first line of the plurality of lines.

19. An apparatus according to claim 18, wherein, in a case where a signal of the nonstandard procedure cannot be detected a predetermined number of times, transmission of a signal of the nonstandard procedure is inhibited.

20. An apparatus according to claim 18, wherein when a signal of the nonstandard procedure from a partner apparatus is received in a communication after inhibition of transmission of a signal of the nonstandard procedure, the inhibition is released.

* * * * *

UNITED STATES PATENT AND TRADEMARK OFFICE
CERTIFICATE OF CORRECTION

PATENT NO. : 6,476,937 B1 Page 1 of 1
DATED : November 5, 2002
INVENTOR(S) : Takehiro Yoshida It is certified that error appears in the above-identified patent and that said Letters Patent is hereby corrected as shown below:

Column 5,
Lines 13 and 28, "in" (second occurrence) should read -- of --.
Line 15, "N0" should read -- NO --.
Line 35, "every" should read -- for every --.

Column 6,
Line 20, "that" should be deleted.
Line 24, "does not pass" should read -- passes --.

Column 7,
Line 17, "information information" should read -- information --.

Column 9,
Line 23, "signal s" should read -- signals --.
Line 24, "follows." should read -- follows. --.

Column 11,
Line 15, "certain" should read -- certainly --.
Line 18, "applied" should read -- applied for --.

Column 12,
Line 65, "claim 9," should read -- claim 7, --.

Column 14,
Line 42, "wherein" should read -- wherein, --.

Signed and Sealed this

Twenty-second Day of April, 2003

JAMES E. ROGAN
*Director of the United States Patent and Trademark Office*